(12) United States Patent
Lu et al.

(10) Patent No.: US 10,782,008 B1
(45) Date of Patent: Sep. 22, 2020

(54) LIGHTENING MOUSE PAD WITH MULTIPLE LIGHT SOURCES

(71) Applicant: HADES-GAMING CORP., New Taipei (TW)

(72) Inventors: Ho Lung Lu, New Taipei (TW); Hung Jen Chou, New Taipei (TW)

(73) Assignee: HADES-GAMING CORP., New Taipei (TW)

( * ) Notice: Subject to any disclaimer, the term of this patent is extended or adjusted under 35 U.S.C. 154(b) by 0 days.

(21) Appl. No.: 16/707,394

(22) Filed: Dec. 9, 2019

(30) Foreign Application Priority Data

Apr. 18, 2019 (TW) ................................ 108113515 A
May 31, 2019 (TW) ................................ 108118894 A

(51) Int. Cl.
| | |
|---|---|
| *G06F 3/039* | (2013.01) |
| *F21V 23/00* | (2015.01) |
| *H05B 45/20* | (2020.01) |
| *H05B 45/10* | (2020.01) |
| *F21Y 115/10* | (2016.01) |
| *F21V 33/00* | (2006.01) |

(52) U.S. Cl.
CPC .......... *F21V 23/003* (2013.01); *G06F 3/0395* (2013.01); *H05B 45/10* (2020.01); *H05B 45/20* (2020.01); *F21V 33/00* (2013.01); *F21V 33/0052* (2013.01); *F21Y 2115/10* (2016.08); *G06F 3/039* (2013.01)

(58) Field of Classification Search
CPC .... F21V 23/003; F21V 33/00; F21V 33/0048; F21V 33/0052; G02B 6/001; G02B 6/0021; G02B 6/0045; G02B 6/0088; G02B 6/0095; G06F 3/03543; G06F 3/039; G06F 3/0395; H05B 45/10; H05B 45/20; F21Y 2115/10
See application file for complete search history.

(56) References Cited

U.S. PATENT DOCUMENTS

| | | | | |
|---|---|---|---|---|
| 5,556,061 A | * | 9/1996 | Dickie | G06F 3/0395 248/118 |
| 6,635,336 B1 | * | 10/2003 | Chen | G06F 3/0395 248/346.01 |
| 7,175,310 B1 | * | 2/2007 | Cotterell | G06F 3/0395 362/253 |

FOREIGN PATENT DOCUMENTS

| | | | | |
|---|---|---|---|---|
| DE | 102005002449 | * | 7/2006 | ........... G06F 3/0395 |
| WO | WO2004072889 | * | 8/2004 | ........... G06F 3/0395 |

* cited by examiner

*Primary Examiner* — Zheng Song
(74) *Attorney, Agent, or Firm* — Browdy and Neimark, P.L.L.C.

(57) ABSTRACT

A lightening mouse pad with multiple light sources comprises: a mouse pad body; a plurality of lightening boxes, each of the lightening boxes is respectively arranged on each corner of the mouse pad body; a plurality of light guiding bars, each of the light guiding bars is arranged around the mouse pad body and is arranged between two adjacent lightening boxes; each of the lightening boxes therein comprises: a printed circuit board which is provided with a control circuit; and two light emitting diodes which are respectively arranged on two surfaces of the printed circuit board, the control circuit supplies a power source to the two light emitting diode.

7 Claims, 5 Drawing Sheets

LIGHTENING MOUSE PAD WITH MULTIPLE LIGHT SOURCES

BACKGROUND

Technical Field

The present invention relates to the field of computer peripherals, and particularly relates to a lightening mouse pad with multiple light sources.

Related Art

A traditional mouse pad is usually designed into a square or round non-slip pad which is monotonous in shape and has no decorative property. In order to develop a mouse pad with better decorative and functional properties, the present invention is directed to a lightening mouse pad with a light emitting function.

FIG. 1 is a top view of a conventional lightening mouse pad. In FIG. 1, a lightening mouse pad 10 comprises a non-slip pad body 12, a light guiding bar 14, and a control box 16. The control box 16 is internally provided with light emitting diodes (not shown) and a printed circuit board (not shown). The light guiding bar 14 is arranged around the non-slip pad body 12 to emit decorative light. The printed circuit board supplies power to the light emitting diodes, and the light emitting diodes emit light to the light guiding end surface of the light guiding bar 14, so that the light guiding bar 14 emits light around the non-slip pad body. The luminance of the light guiding bar 14 gradually decreases as the light guiding bar 14 moves away from the light emitting diodes. For a small-size lightening mouse pad 10, the luminance decrease of the light guiding bar 14 is not relatively obvious. For a large-size lightening mouse pad 10, the luminance decrease at a position away from the light emitting diodes of the light guiding bar 14 is severe, so that the light guiding bar 14 is darkened.

SUMMARY

In view of the above problems, the present invention is directed to a lightening mouse pad with multiple light sources. A large-size lightening mouse pad is provided with a plurality of light emitting diodes so as to enable light guiding bars arranged around a mouse pad body to emit light uniformly.

An example of the present invention provides a lightening mouse pad with multiple light sources, comprising:
a mouse pad body;
a plurality of lightening boxes, each of the lightening boxes is respectively arranged on each corner of the mouse pad body;
a plurality of light guiding bars, each of the light guiding bars is arranged around the mouse pad body and is arranged between two adjacent lightening boxes;
each of the lightening boxes therein comprises:
a printed circuit board which is provided with a control circuit; and
two light emitting diodes which are respectively arranged on two surfaces of the printed circuit board, the light emitting surface of each of the two light emitting diodes is opposite to the light guiding end surface of each of the light guiding bars, the control circuit supplies a power source to the two light emitting diodes,
wherein the control circuits of the lightening boxes are connected to each other through a power wire.

According to the example of the present invention, the lightening boxes are made of semi-transparent plastic materials.

According to the example of the present invention, the control circuit controls the two light emitting diodes to emit light in a marquee, mixed light or streamer mode.

According to the example of the present invention, each of the two light emitting diodes is an RGB (Red, Green, Blue) light emitting diode, and the light emitting intensity of one of the two light emitting diodes of the light guiding end surface of one of the light guiding bars on the long edges of the mouse pad body is greater than the light emitting intensity of the other one of the two light emitting diodes of the light guiding end surface of another one of the light guiding bars on the short edges of the mouse pad body.

According to the example of the present invention, each of the lightening boxes comprises an upper lid and a lower lid, and the upper lid and the lower lid are clamped or locked to the periphery of a corner of the mouse pad body.

According to the example of the present invention, the power wire is embedded inside the mouse pad body through a wire embedding and bottom sealing technology.

DETAILED DESCRIPTION

In order to enable the ordinary technicians skillful at the technical field of the present invention to further understand the present invention, the contents and effects of the present invention are described in detail as below through the preferred embodiments of the present invention in cooperation with accompanying drawings.

Figure 1:
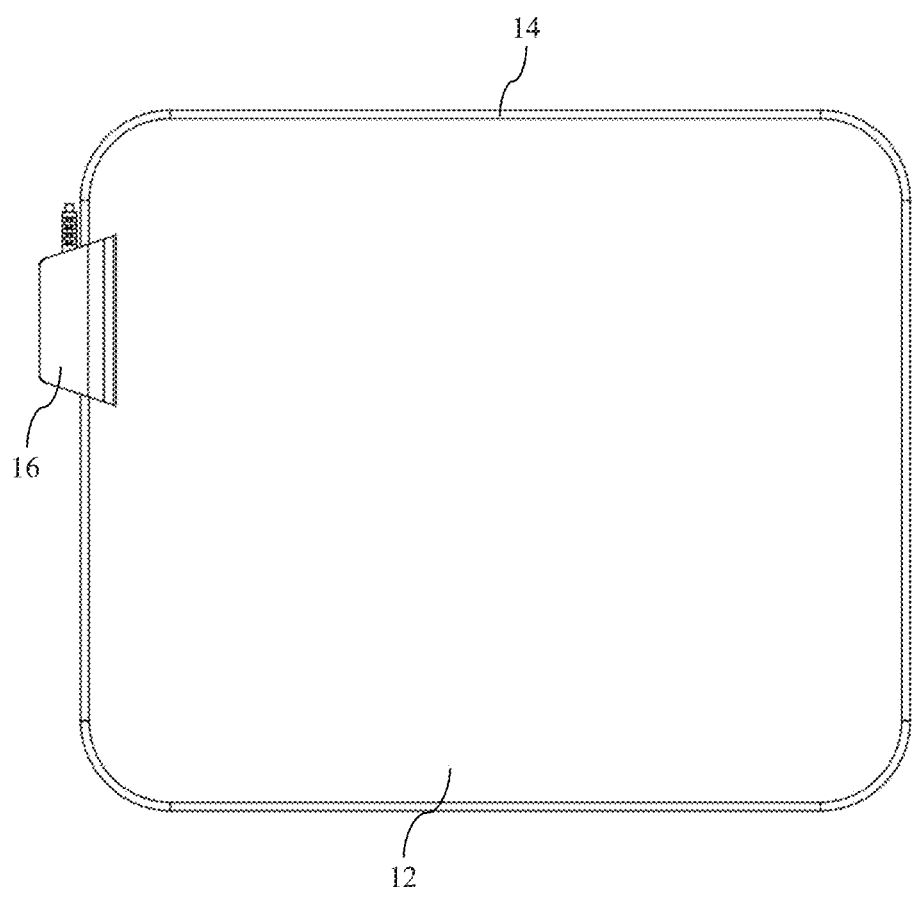
FIG. 1 is a top view of a conventional lightening mouse pad.
Figure 2:
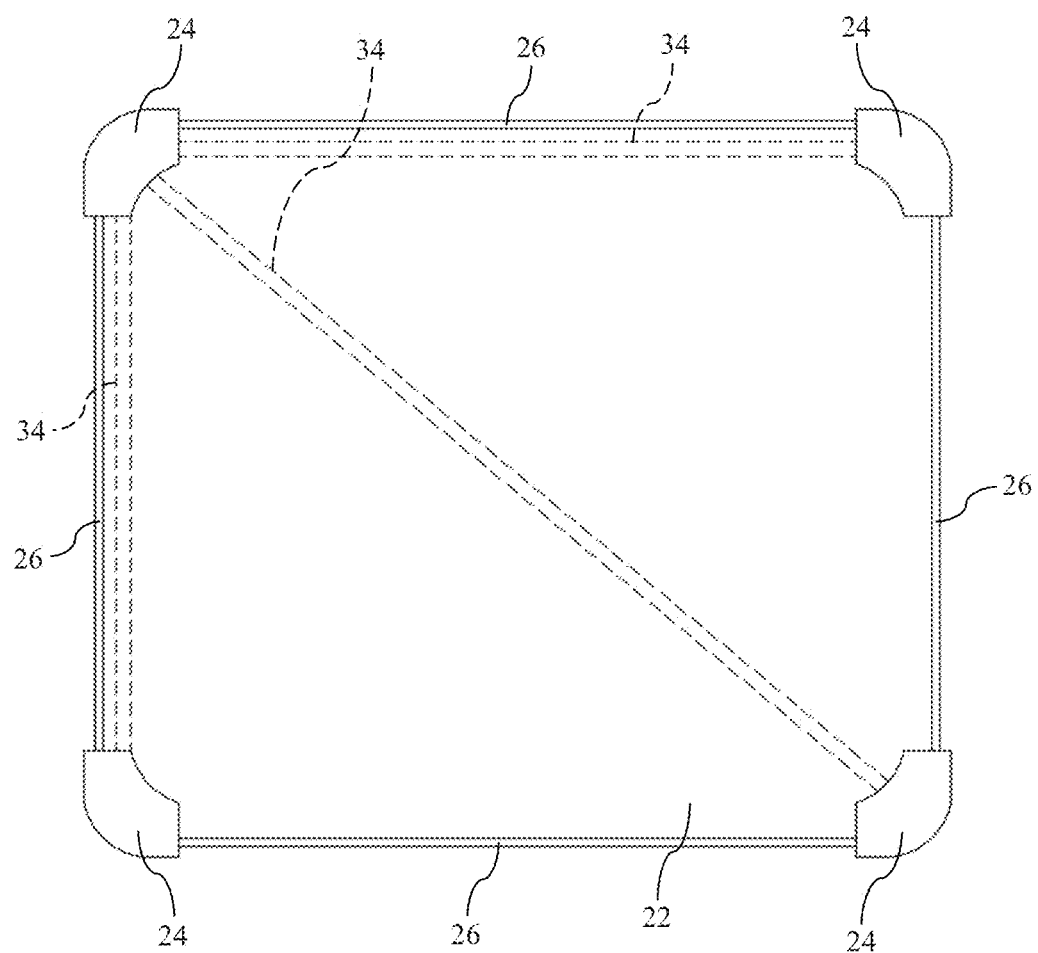
FIG. 2 is a top view of the lightening mouse pad with multiple light sources of the present invention.
Figure 3:
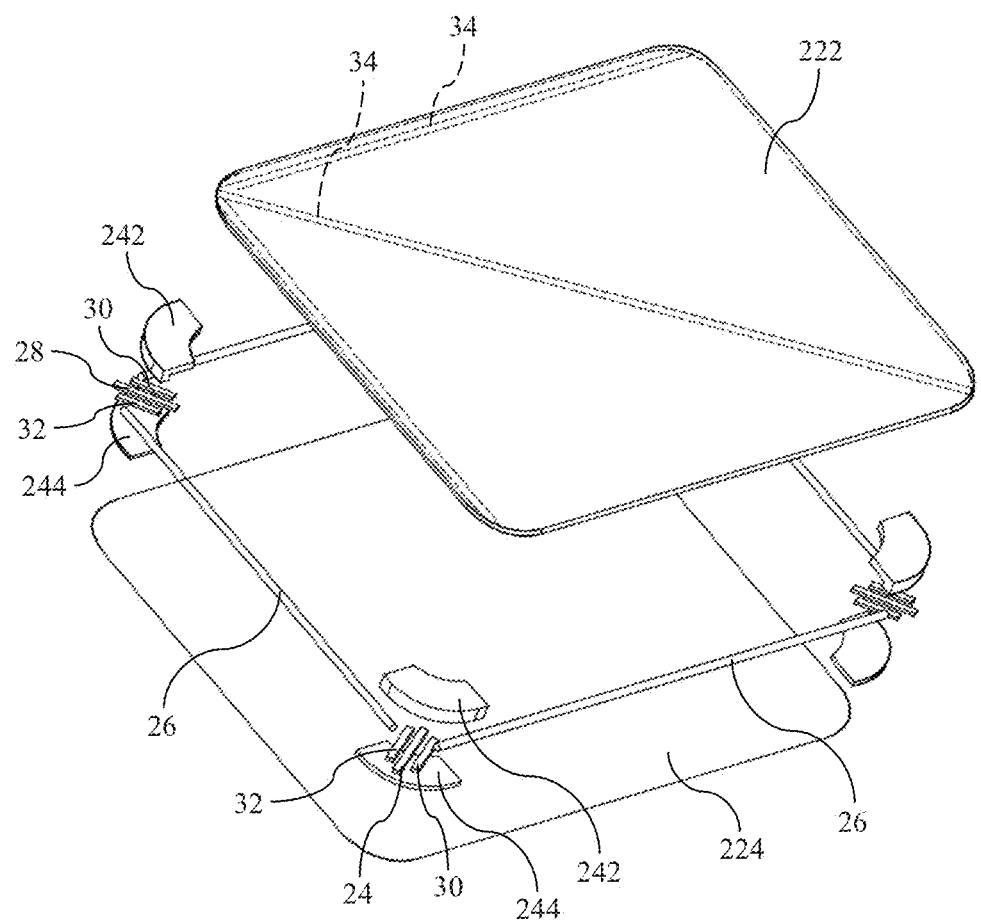
FIG. 3 is an exploded view of the lightening mouse pad with multiple light sources of the present invention.
Figure 4:
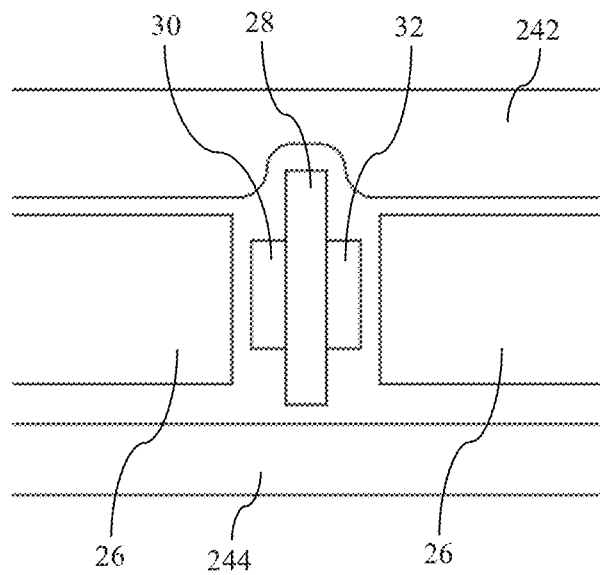
FIG. 4 is a partial schematic view of the lightening mouse pad with multiple light sources of the present invention.
Figure 5:
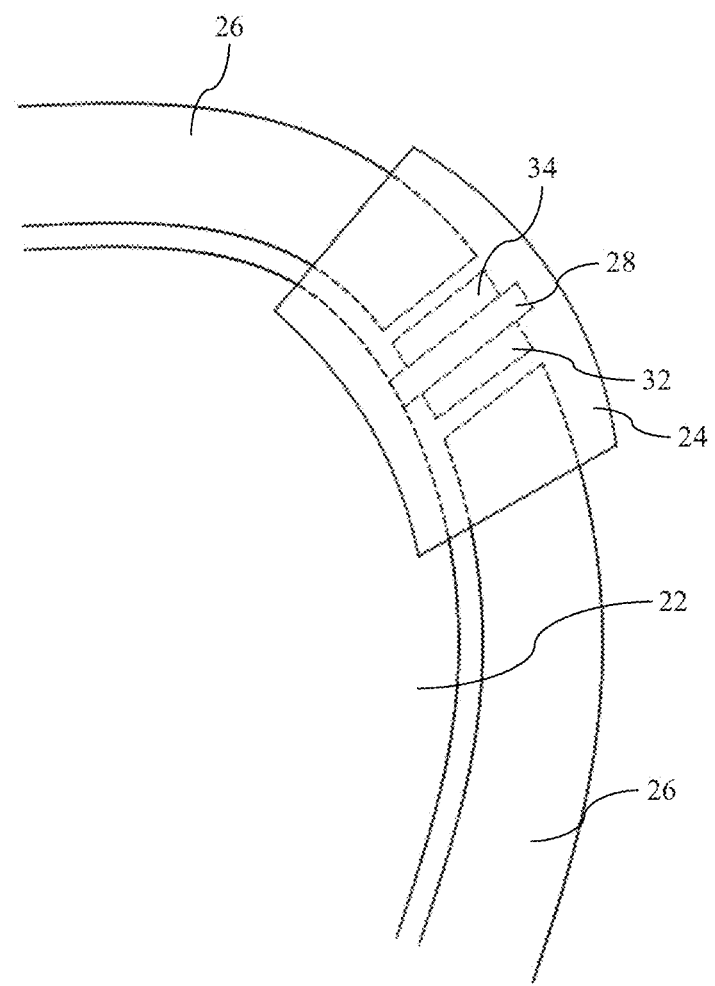
FIG. 5 is a cross-sectional schematic view of a lightening box of the present invention.

FIG. 2 is a top view of a lightening mouse pad with multiple light sources of the present invention. FIG. 3 is an exploded view of the lightening mouse pad with multiple light sources of the present invention. FIG. 4 is a partial schematic view of the lightening mouse pad with multiple light sources of the present invention. FIG. 5 is a cross-sectional schematic view of a lightening box of the present invention.

In FIG. 2 to FIG. 5, a lightening mouse pad 20 with multiple light sources includes a mouse pad body 22, a plurality of lightening boxes 24, and a plurality of light guiding bars 26. The mouse pad body 22 includes an upper mouse pad body 222 and a lower mouse pad body 224 (as shown in FIG. 3). However, the mouse pad body 22 of the present invention is not limited to two layers of structures. Two or more layers of structures are also applied to the mouse pad body 22 of the present invention.

Each of the lightening boxes 24 is respectively arranged at each corner of the mouse pad body 22, and each of the light guiding bars 26 is arranged around the mouse pad body 22 and is arranged between two adjacent lightening boxes 24. Each of the lightening boxes 24 includes an upper lid 242 and a lower lid 244 (as shown in FIG. 3). Each of the lightening boxes 24 is therein provided with a printed circuit board 28 and two light emitting diodes 30 and 32 (as shown in FIG. 4 and FIG. 5). The printed circuit board 28 and the light emitting diodes 30 and 32 are arranged between the upper lid 242 and the lower lid 244 and are clamped or locked to the periphery of one corner of the mouse pad body 22.

The printed circuit board 28 is provided with a control circuit (not shown in figures). The present invention is not limited to each printed circuit board being provided with the control circuit. For example, one printed circuit board is provided with the control circuit to control all light emitting diodes, or a part of the printed circuit board is provided with the control circuit to control all light emitting diodes. The control circuit of each of the lightening boxes 24 are connected to each other through a power wire 34, and the power wire 34 is embedded inside the mouse pad body 22 through a wire embedding and bottom sealing technology. The wire embedding and bottom sealing technology refers to a cutting groove wire embedding and bottom sealing technology, an etching groove wire embedding and bottom sealing technology, a hot pressing groove wire embedding and bottom sealing technology, an engraving groove wire embedding and bottom sealing technology, a forming groove wire embedding and bottom sealing technology, or a sintering groove wire embedding and bottom sealing technology.

The two light emitting diodes 30 and 32 are respectively arranged on two surfaces of the printed circuit board 28, the light emitting surface of each of the light emitting diodes 30 and 32 is opposite to the light guiding end surface of each of the light guiding bars 26, the control circuit supplies a power source to the two light emitting diodes 30 and 32, and the control circuit controls the two light emitting diodes 30 and 32 to emit light in a marquee, mixed light or streamer mode.

In FIG. 2, the mouse pad body 22 is a rectangle with long edges and short edges. Each of the light emitting diodes 30 and 32 is an RGB light emitting diode, and the light emitting intensity of the light emitting diodes 30 and 32 of the light guiding end surfaces of the light guiding bars 26 on the long edges of the mouse pad body 22 is greater than the light emitting intensity of the light emitting diodes 30 and 32 of the light guiding end surfaces of the light guiding bars 26 on the short edges of the mouse pad body 22.

Because the light emitting intensity of the light emitting diodes 30 and 32 of the light guiding bars 26 on the long edges of the mouse pad body 22 is greater than the light emitting intensity of the light emitting diodes 30 and 32 of the light guiding bars 26 on the short edges of the mouse pad body 22, the luminance of the light guiding bars 26 on the long edges of the mouse pad body 22 is approximately equivalent to the luminance of the light guiding bars 26 on the short edges of the mouse pad body 22, and the overall luminance distribution of the periphery of the mouse pad body 22 could be uniform.

Each of the lightening boxes 24 is made of a semi-transparent plastic material, such as a silica gel material. The semi-transparent plastic has an atomizing effect. A part of light emitted by the light emitting diodes 30 and 32 enters the light guiding end surfaces of the light guiding bars 26, and the light which does not enter the light guiding end surfaces of the light guiding bars 26 is transmitted by the lightening boxes 24 with the atomizing effect. That is, the corners of the mouse pad body 22 also emit light, so that the light around the mouse pad body 22 is continuous.

The present invention is directed to a lightening mouse pad with multiple light sources, which is characterized in that the large-size lightening mouse pad is provided with a plurality of light emitting diodes so as to enable the light guiding bars arranged around the mouse pad body to emit light uniformly.

Although the present invention is described with reference to preferred embodiments and exemplary drawings as above, the present invention is not limited thereto. Various modifications, omissions and changes made on the examples and content of the embodiments of the present invention by technicians skilled in the art, do not depart from the scope of the claims of the present invention.

LIST OF REFERENCE NUMERALS

10 Lightening mouse pad
12 Non-slip pad body
14 Light guiding bar
16 Control box
20 Lightening mouse pad with multiple light sources
22 Mouse pad body
24 Lightening box
26 Light guiding bar
28 Printed circuit board
30 Light emitting diode
32 Light emitting diode
34 Power wire
222 Upper mouse pad body
224 Lower mouse pad body
242 Upper lid
244 Lower lid

What is claimed is:

1. A lightening mouse pad with multiple light sources, comprising:
   a mouse pad body;
   a plurality of lightening boxes, each of the lightening boxes is respectively arranged on each corner of the mouse pad body;
   a plurality of light guiding bars, each of the light guiding bars is arranged around the mouse pad body and is arranged between two adjacent lightening boxes;
   each of the lightening boxes therein comprises:
   a printed circuit board which is provided with a control circuit; and
   two light emitting diodes which are respectively arranged on two surfaces of the printed circuit board, the light emitting surface of each of the two light emitting diodes is opposite to the light guiding end surface of each of the light guiding bars, the control circuit supplies a power source to the two light emitting diodes,
   wherein the control circuits of the lightening boxes are connected to each other through a power wire.

2. The lightening mouse pad with multiple light sources according to claim 1, wherein the lightening boxes are made of semi-transparent plastic materials.

3. The lightening mouse pad with multiple light sources according to claim 1, wherein the control circuit controls the two light emitting diodes to emit light in a marquee, mixed light or streamer mode.

4. The lightening mouse pad with multiple light sources according to claim 1, wherein each of the two light emitting diodes is an RGB (Red, Green, Blue) light emitting diode, and the light emitting intensity of one of the two light emitting diodes of the light guiding end surface of one of the light guiding bars on the long edges of the mouse pad body is greater than the light emitting intensity of the other one of the two light emitting diodes of the light guiding end surface of another one of the light guiding bars on the short edges of the mouse pad body.

5. The lightening mouse pad with multiple light sources according to claim 1, wherein each of the lightening boxes comprises an upper lid and a lower lid, and the upper lid and the lower lid are clamped or locked to the periphery of a corner of the mouse pad body.

6. The lightening mouse pad with multiple light sources according to claim 1, wherein the power wire is embedded inside the mouse pad body through a wire embedding and bottom sealing technology.

7. The lightening mouse pad with multiple light sources according to claim 1, wherein the wire embedding and bottom sealing technology refers to one of a cutting groove wire embedding and bottom sealing technology, an etching groove wire embedding and bottom sealing technology, a hot pressing groove wire embedding and bottom sealing technology, an engraving groove wire embedding and bottom sealing technology, a forming groove wire embedding and bottom sealing technology, and a sintering groove wire embedding and bottom sealing technology.

* * * * *